(12) United States Patent
Jeffery

(10) Patent No.: US 9,558,286 B2
(45) Date of Patent: Jan. 31, 2017

(54) METHODS, SYSTEMS, AND PRODUCTS FOR GENERATING MASHUPS

(71) Applicant: AT&T Intellectual Property I, L.P., Atlanta, GA (US)

(72) Inventor: Donald Jeffery, Matawan, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 526 days.

(21) Appl. No.: 13/706,375

(22) Filed: Dec. 6, 2012

(65) Prior Publication Data

US 2014/0164359 A1 Jun. 12, 2014

(51) Int. Cl.
*G06F 17/30* (2006.01)

(52) U.S. Cl.
CPC ..... *G06F 17/3089* (2013.01); *G06F 17/30424* (2013.01); *G06F 17/30554* (2013.01); *G06F 17/30696* (2013.01)

(58) Field of Classification Search
CPC .............. G06F 17/30424; G06F 17/30554; G06F 17/30696
USPC ........................................................ 707/722
See application file for complete search history.

(56) References Cited

U.S. PATENT DOCUMENTS

| | | | |
|---|---|---|---|
| 5,933,830 A | 8/1999 | Williams | |
| 7,627,658 B2 | 12/2009 | Levett et al. | |
| 8,112,307 B2 | 2/2012 | Forman | |
| 8,302,020 B2 | 10/2012 | Louch et al. | |
| 2004/0225955 A1 | 11/2004 | Ly | |
| 2008/0082637 A1 | 4/2008 | Krainz et al. | |
| 2009/0313601 A1* | 12/2009 | Baird et al. | 717/106 |
| 2010/0169794 A1 | 7/2010 | Kenna et al. | |
| 2011/0225525 A1 | 9/2011 | Chasman et al. | |
| 2011/0314373 A1 | 12/2011 | Prophete et al. | |
| 2012/0041990 A1* | 2/2012 | Kreindlina et al. | 707/805 |
| 2012/0124499 A1 | 5/2012 | Tsai | |

* cited by examiner

*Primary Examiner* — Joshua Bullock
(74) *Attorney, Agent, or Firm* — Scott P. Zimmerman, PLLC

(57) ABSTRACT

Methods, systems, and products simplify widgets for graphical mashups, such as digital dashboards and other user interfaces. When a software widget is a component of a graphical mashup, the widget is completely defined using a single file. The single file specifies both source data and presentation of the source data. Because the widget is completely defined by the single file, the single file allows faster processing of the widget.

20 Claims, 20 Drawing Sheets

FIG. 12

Model – View – Controller (MVC) Architecture

- OSD / LPP Standard Architecture
  - Spring MVC
  - HTML / JSP / JQuery
  - Model Classes
    - POJOs
    - Spring MVC (org.springframework.ui.Model)
- Push Technology
  - ICEPush
    - Push notification for real-time charting of time series data etc.
    - ICEpush is based on a lightweight, asynchronous Notification Core that leverages long polling over HTTP.
    - Supports Spring MVC / (Javascript + Jquery)

FIG. 13

```xml
<bean id="streamsDriver" class="com.att.lpp.dashboard.streams.impl.StreamsDriver">
    <property name="streams">
        <list>
            <bean class="com.att.lpp.dashboard.dashlet.pasummary.streams.PortAssignmentSummaryStream">
                <property name="dbRef" value="stbids"/>
                <property name="pollInterval" value="60 sec"/>
            </bean>
        </list>
    </property>
</bean>
```

- 120: `<bean id="streamsDriver" ...>` through `<list>`
- 122: inner `<bean class="...PortAssignmentSummaryStream">` block
- 124: `<bean class=...>`
- 126: `<property name="dbRef" value="stbids"/>`
- 128: `<property name="pollInterval" value="60 sec"/>`
- 54: bracket around inner bean
- 50: overall

FIG. 14

*Dashlet Jar Format - Strategy*

- *Dashlet* Services
  - Utilizes Java SE *ServiceLoader*
  - META-INF/services
  - Service Definitions:
    - Dashlet Visualizations
    - Dashlet Controllers
    - Dashlet Streams
  - *Dashlet* Code space
    - *com/att/tppdashlet/<dashletname>/\**
  - *Dashlet* Resource space
    - resources/<dashletname>/*

FIG. 15

Dashboard UI Framework

- Themes
  - Customized User Experience and L&F Preferences
    - JQueryUI CSS Framework
    - Themeroller
- Panels
  - Based on JQueryUI *Sortable*
  - Support Drag & Drop
  - Standard Control Set
    - Minimize / Maximize
    - Refresh
    - Delete
    - Chart
    - Print
    - Export
- Widgets
  - Supported by Dashboard UI framework
  - Loadable *Dashlet* Widget (for displaying arbitrary *Dashlet* views)
  - Documentation Widget
  - Navigational Widget
    - Tree-based access to categorically organized *Dashlet* widgets
  - JQueryUI
  - Datatable
- Tables
  - JQuery Datatable
- Charts
  - Highcharts

FIG. 16 statementPattern = "@Hook(type=HookType.SQLROW, hook="{1}")"

insert into {0} select servicesCount, network, serviceName from pattern [every timer:interval({3})], sql:{2} [\"select count(*) as servicesCount, em.network as network, sv.serv_name as serviceName from site s, ip_serv_acc_pt sap, service sv, ip_port_asgmt pa, ip_assigned_endpt ae, component c, equip_model em, equipment e where sap.SITE_ID = s.SITE_ID and sap.SERV_ID = sv.SERV_ID and pa.SERV_ACC_PT_ID = sap.SERV_ACC_PT_ID and pa.IP_ENDPT = ae.ENDPOINT_ID and ae.COMP_ID = c.COMP_ID and e.EQUIP_ID = c.EQUIP_ID and e.EQUIP_MOD_ID = em.EQUIP_MOD_ID and pa.PA_TYPE in ("Physical", "Regular") and sv.SERV_NAME <> "MIPNS" group by em.network, s.AGN_FLAG, sv.SERV_NAME\"]";

- <script type=*"text/javascript"*>
- $(document).ready(
- function() {
-     $("#pasummary").dataTable(
-     {
-         "bServerSide" : true,
-         "sAjaxSource" : "/lpp-dashboard-proto/dashboard/main/dashboard/pasummary/updatetable",
-         "bProcessing" : true,
-         "sPaginationType" : "full_numbers",
-         "bJQueryUI" : true,
-         "aoColumns": [
-             { "mDataProp": "servicesCount" },
-             { "mDataProp": "network" },
-             { "mDataProp": "serviceName" }
-         ]
-     });
- });
- </script>

METHODS, SYSTEMS, AND PRODUCTS FOR GENERATING MASHUPS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Graphical mashups visually present data. A mashup may integrate data specified by one or more widgets. Widgets, though, are difficult to specify, thus leading to errors in integration.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 11-12 are schematics illustrating a detailed operating environment, according to exemplary embodiments;

FIGS. 13-14 are schematics illustrating a single file structure of the widget, according to exemplary embodiments;

FIG. 15 is another schematic illustrating the mashup, according to exemplary embodiments;

FIG. 16 is another schematic illustrating the widget, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
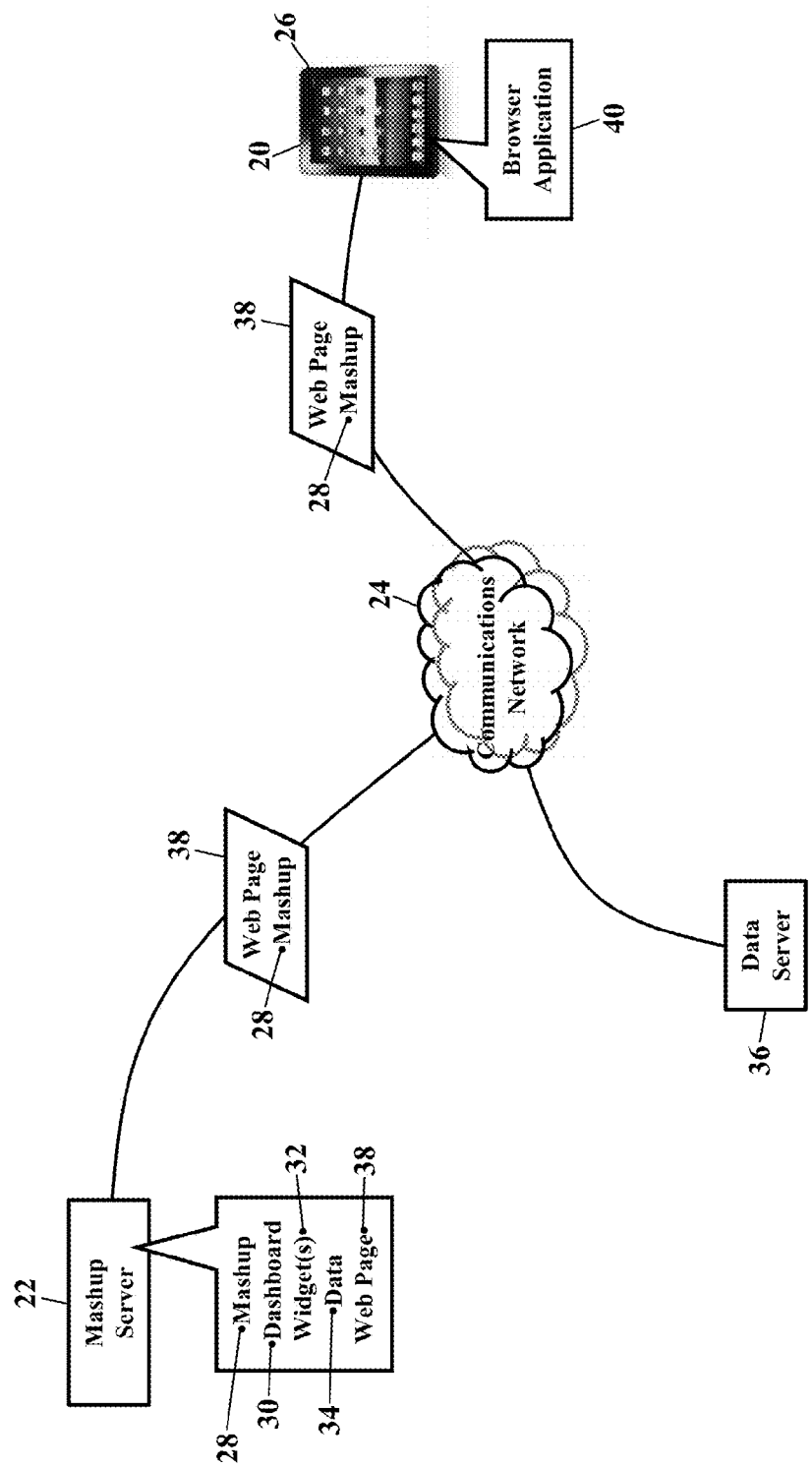
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client device 20 that communicates with a mashup server 22 via a communications network 24. The client device 20, for simplicity, is illustrated as a tablet computer 26, but the client device 20 may be any processor-controlled device (as later paragraphs will explain). The mashup server 22 generates a software-based mashup 28 for delivery to the client device 20. The mashup 28 may be a composite software product, such as a digital dashboard 30 or any other graphical user interface. Whatever the mashup 28, the mashup 28 integrates one or more widgets 32 for presenting data 34. Each widget 32 may be a software element for visual presentation. A widget 32, for example, may be a self-contained graphical user interface, such as a pie chart, bar chart, or other software object. The widget 32 obtains its data 34 from a source, such as a data server 36. The mashup server 22 collects the data 34 required by each widget 32 to build the mashup 28. The mashup server 22 then sends the mashup 28 to the client device 20. The mashup server 22, for example, may generate the mashup 28 as a web page 38, thus allowing a browser application 40 in the client device 20 to visually present the mashup 28. The mashup 28 may visually display each widget 32, thus graphically presenting the corresponding data 34 in a pie chart, bar chart, or any other visual object.

Figure 2:
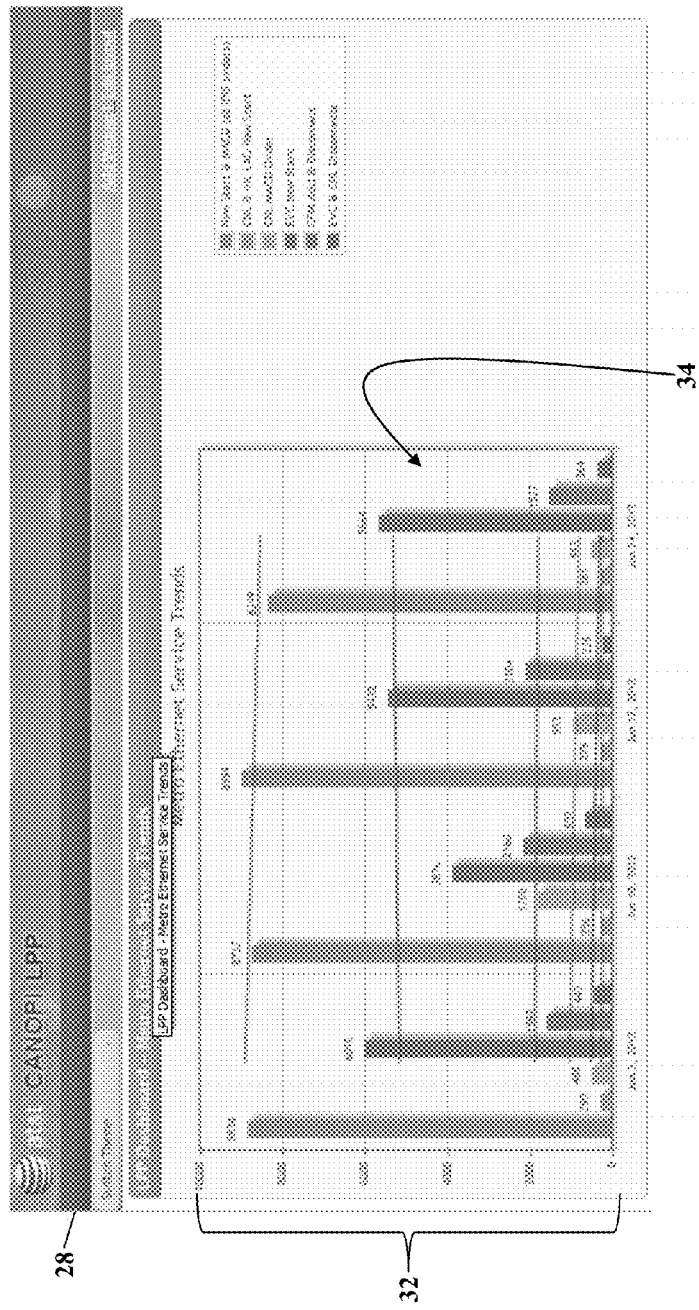
FIGS. 2-3 are screen shots illustrating a mashup, according to exemplary embodiments.
Figure 3:
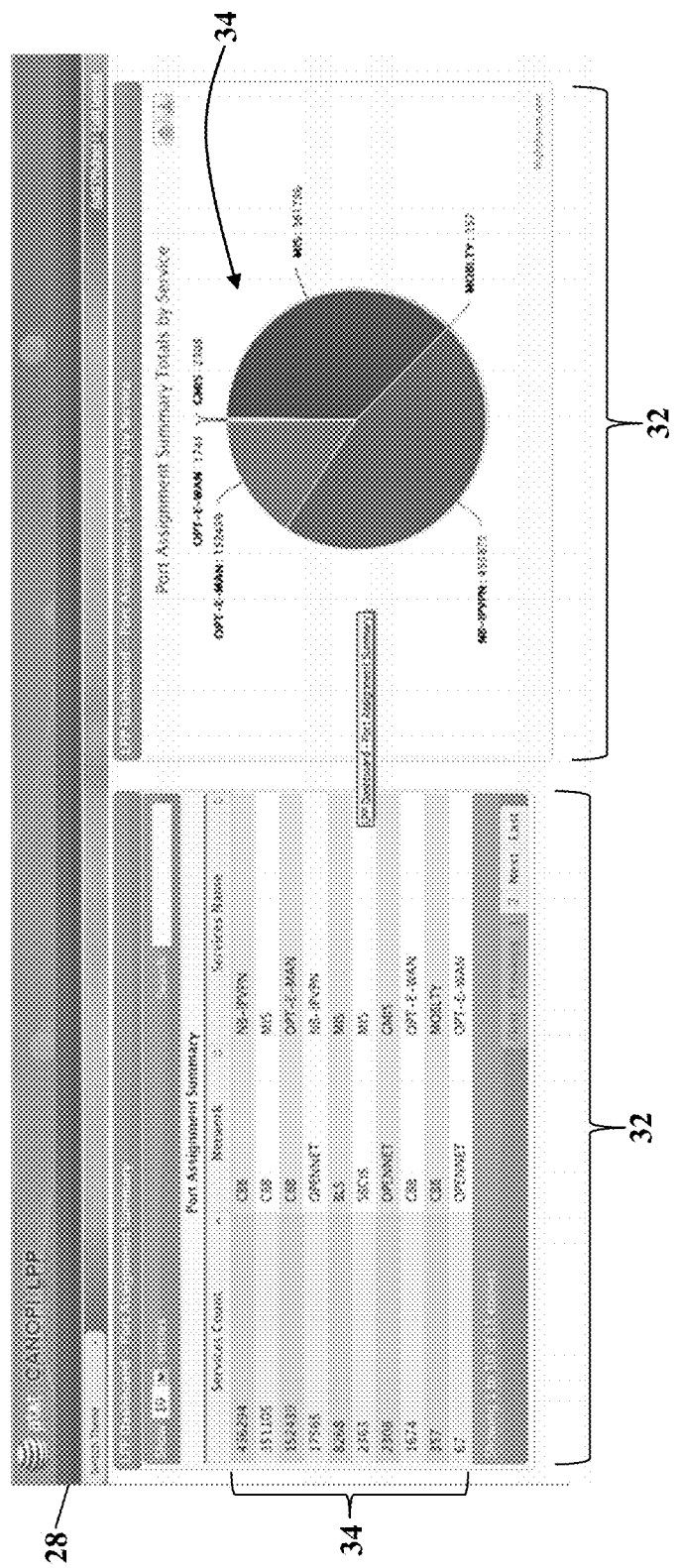

FIGS. 2-3 are screen shots illustrating the mashup 28, according to exemplary embodiments. FIG. 2 illustrates the mashup 28 having a single widget 32 in a single columnar layout. The widget 32 is a bar chart object that is processed for integration into the mashup 28. FIG. 3 illustrates the mashup 28 having two different widgets 32 in a two columnar layout. The mashup 28, however, may have any layout and configuration that arranges the widgets 32 into a graphical user interface. Whatever the layout, the mashup 28 provides tabular and/or graphical views of the data 34, such as key metrics or performance indicators. Moreover, the user may interact with the mashup 28 to request and receive more detailed views of the data 34, such as drilling down for trends, comparisons, and/or distributions.

Figure 4:
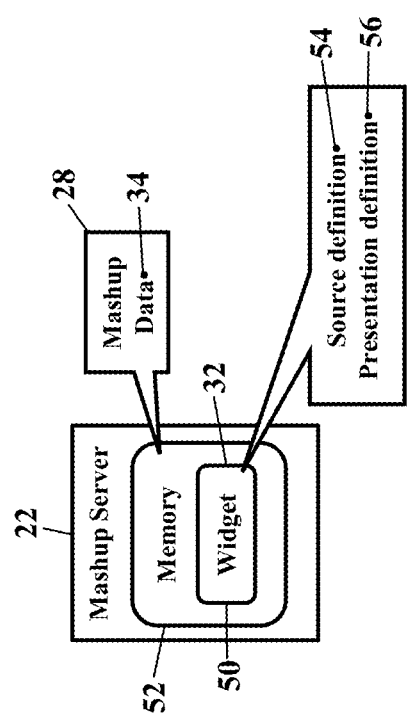
FIG. 4 is a schematic illustrating a widget, according to exemplary embodiments.

FIG. 4 is a schematic illustrating the widget 32, according to exemplary embodiments. Here the widget 32 is illustrated as a single file 50 in memory 52 of the mashup server 22. Because the widget 32 is the single file 50, the widget 32 has a file structure that embodies everything needed for processing. When the mashup server 22 reads the single file 50, the mashup server 22 obtains a source definition 54 and a presentation definition 56. That is, the single file 50 self-specifies both the source of the data 34 to be presented by the widget 32 and how the data 34 is presented in the mashup 28. Whereas conventional widgets are composed of multiple files, exemplary embodiments utilize the single file 50 to completely specify everything needed for processing of the widget 32. The single file 50 structure allows faster processing of the widget 32, thus allowing the mashup server 22 to more quickly respond to dynamic changes in the data 34.

Figure 5:
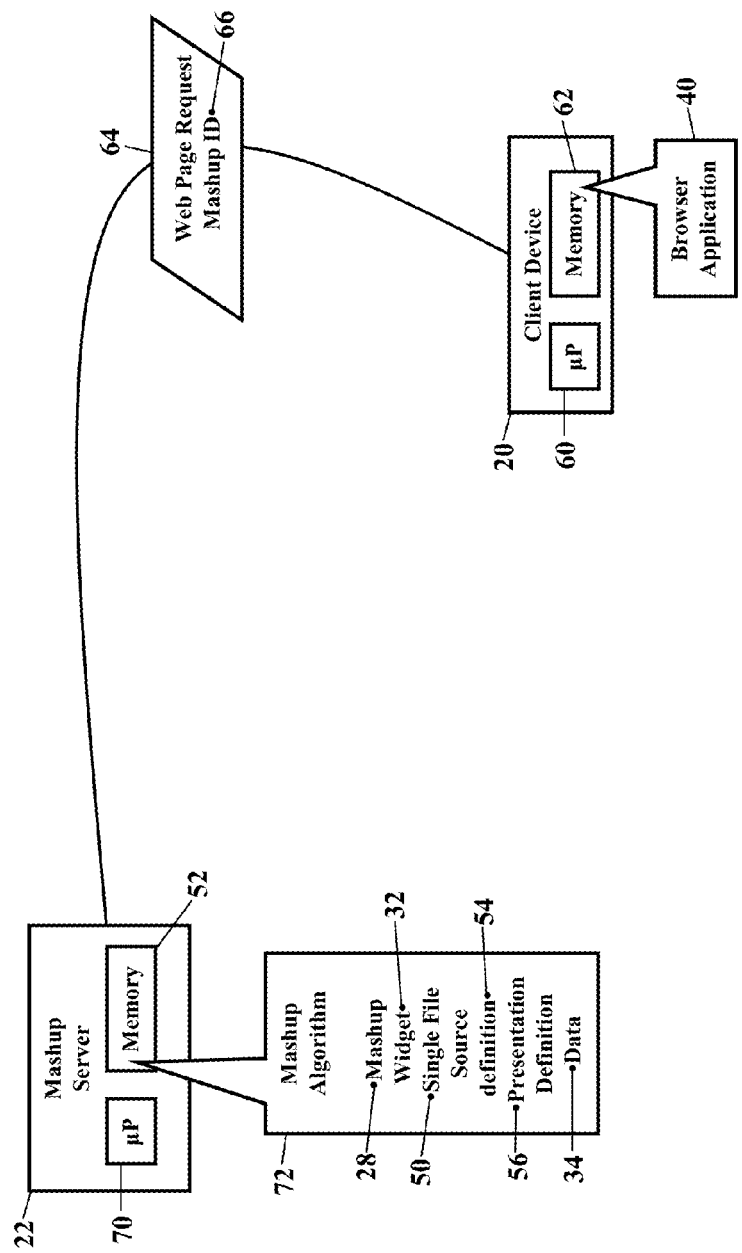
FIGS. 5-7 are more detailed schematics illustrating an operating environment, according to exemplary embodiments.
Figure 6:
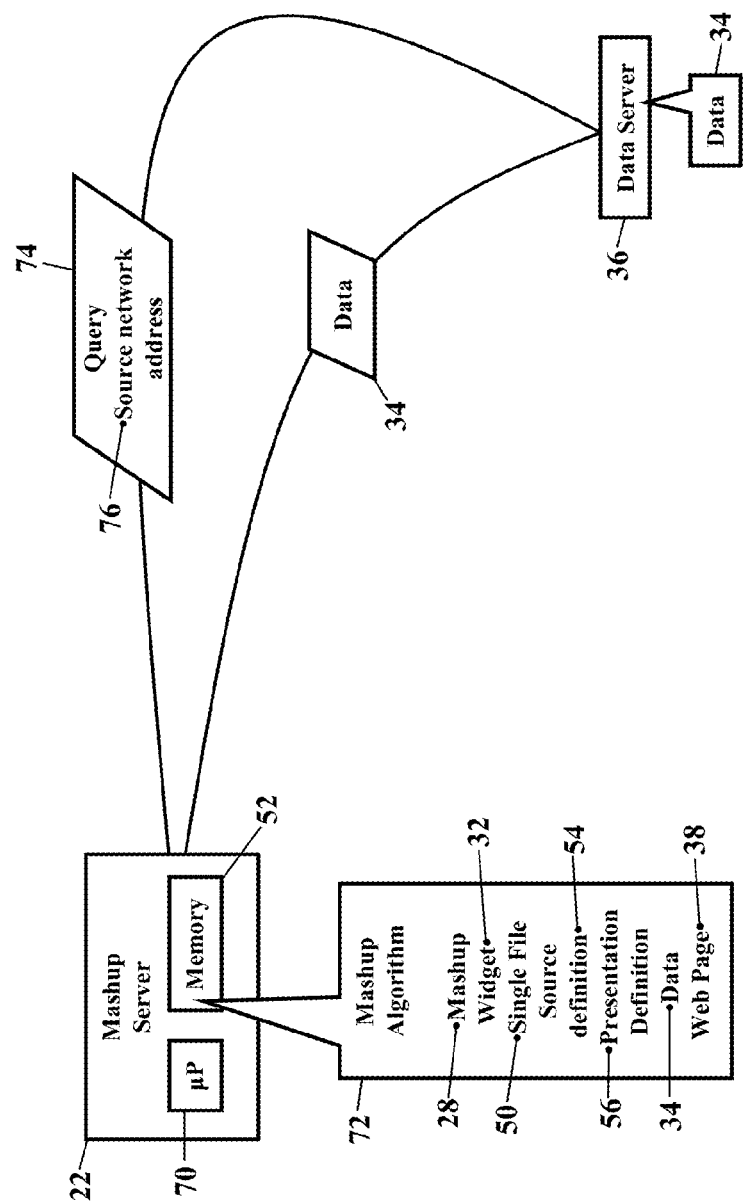
Figure 7:
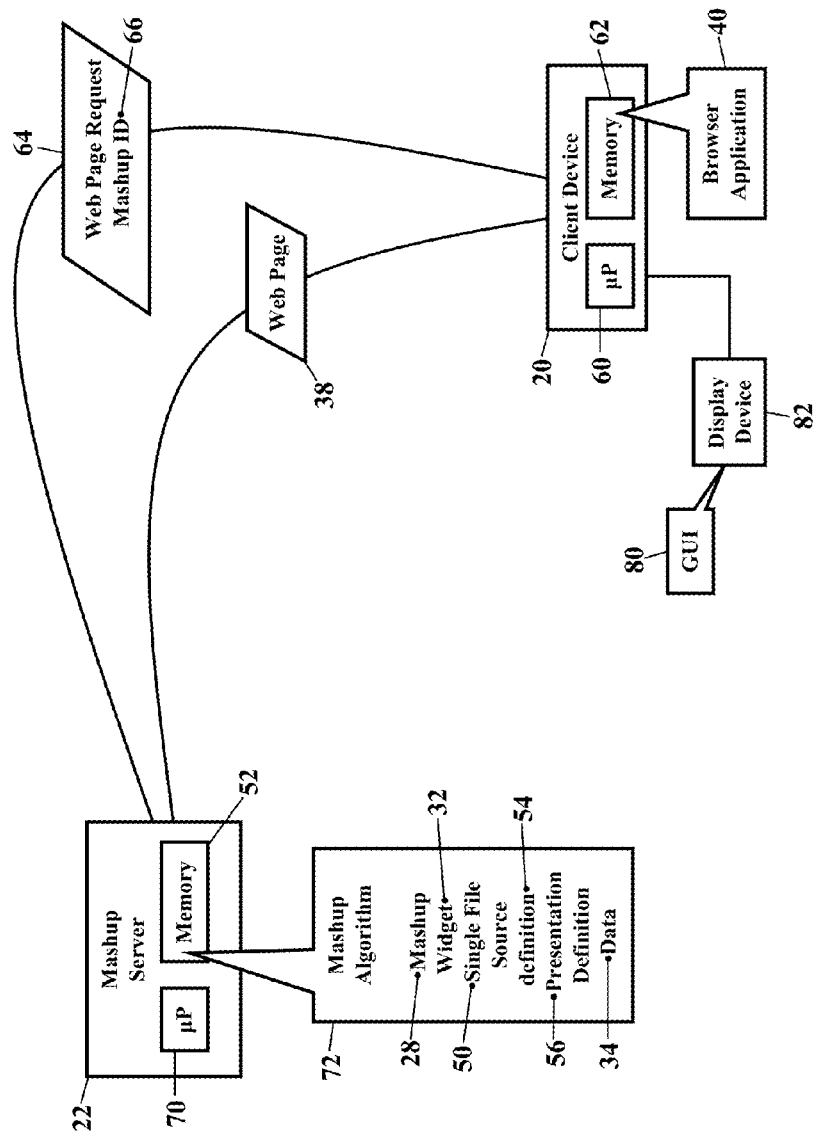

FIGS. 5-7 are more detailed schematics illustrating an operating environment, according to exemplary embodiments. The client device 20 may have a processor 60 (e.g., "μP"), application specific integrated circuit (ASIC), or other component that executes the browser application 40 stored in a local memory 62. When a user of the client device 20 wishes to retrieve the mashup 28, the browser application 40 instructs the client device 20 to send a web page request 64 to the mashup server 22. The web page request 64 routes along the communications network (illustrated as reference numeral 24 in FIG. 1) to the network address associated with the mashup server 22. The web page request 64 specifies a mashup identifier 66 associated with the mashup 28 desired by the client device 20. The mashup identifier 66, for example, may be a name that uniquely identifies the mashup 28 desired by the client device 20.

The mashup server 22 generates the mashup 28. The mashup server 22 has a processor 70 (e.g., "μP"), application specific integrated circuit (ASIC), or other component that executes a mashup algorithm 72 stored in the local memory 52. When the mashup server 22 receives the web page request 64, the mashup algorithm 62 retrieves the widget 32 associated with the mashup identifier 66. The mashup algorithm 62 reads the single file 50 structure of the widget 32 to obtain the source definition 54 and the presentation definition 56. The source definition 54 specifies the data 34 to be retrieved, and the presentation definition 56 specifies how the data 34 is presented in the mashup 28.

FIG. 6 further illustrates the data 34. When the single file 50 structure is read, the mashup algorithm 62 obtains both the source definition 54 and the presentation definition 56. The mashup algorithm 62 instructs the processor 70 to send a query 74 according to the source definition 54. The source definition 54, for example, may specify a source network address 76 from which the data 34 is obtained. FIG. 6, for simplicity, illustrates the query 74 routing to the source network address 76 associated with the data server 36. The data server 36 retrieves the source data 34 and sends the data 34 in a query response. The data 34 routes along the communications network (illustrated as reference numeral 24 in FIG. 1) to the network address associated with the mashup server 22. When the mashup server 22 receives the data 34, the mashup algorithm 62 incorporates the source data 34 into the mashup 28 according to the presentation definition 56. The mashup server 22 may further generate or convert the mashup 28 into the web page 38.

FIG. 7 further illustrates the web page 38. Now that the mashup 28 is built, the mashup server 22 may respond to the web page request 64. When the mashup 28 is generated as the web page 38, the mashup server 22 may send the web page 38 to the network address associated with the client device 20. The client-side browser application 40 causes the processor 60 to generate the mashup 28 as a graphical user interface ("GUI") 80 that is displayed on a display device 82. The user of the client device 20 thus receives a graphical view of the source data 34, such as key metrics or performance indicators that are presented by the web page 38.

Figure 8:
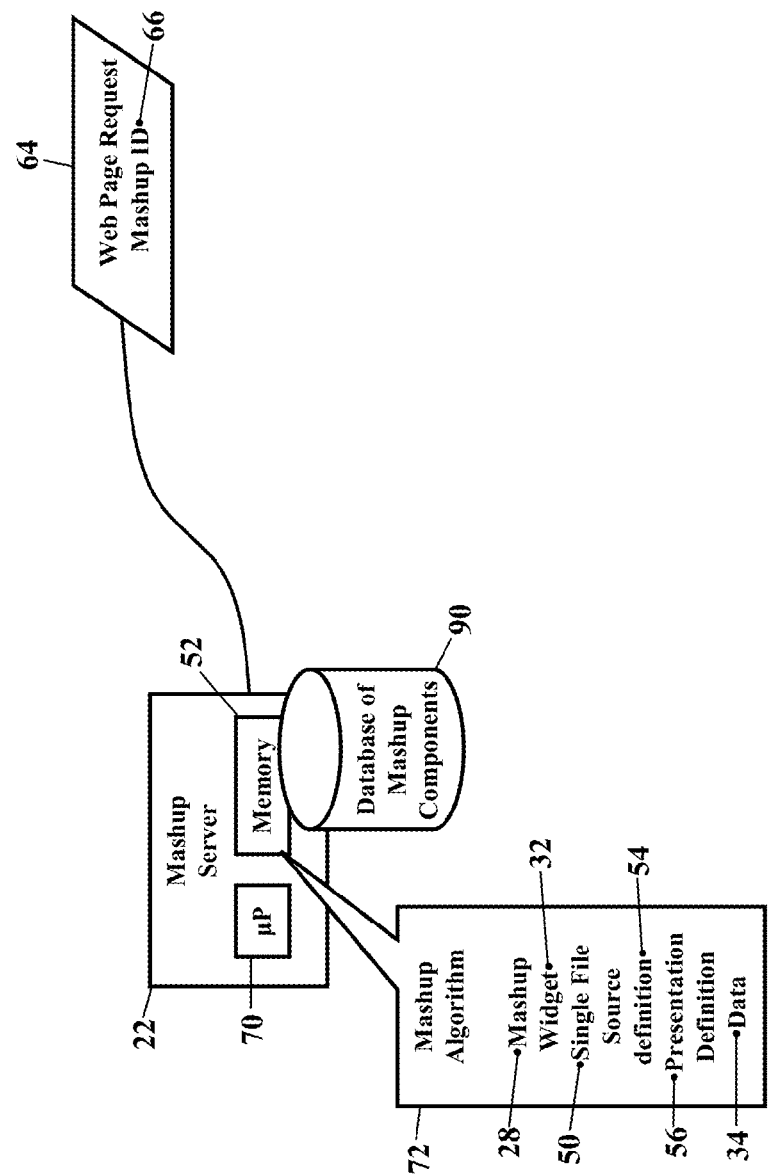
FIG. 8 is a schematic illustrating a database of mashup components, according to exemplary embodiments.

FIG. 8 is a schematic illustrating a database 90 of mashup components, according to exemplary embodiments. When the mashup algorithm 62 builds the mashup 28, the mashup algorithm 62 may need to determine what software components are to be integrated into the mashup 28. The mashup algorithm 62, then, may cause the mashup server 22 to query the database 90 of mashup components. The database 90 of mashup components specifies the software components that are to be integrated into the desired mashup 28. FIG. 8 illustrates the database 90 of mashup components as being locally stored in the memory 52 of the mashup server 22, but the database 90 of mashup components may be remotely stored and accessed from any location in the communications network (illustrated as reference numeral 24 in FIG. 1). The database 90 of mashup components, for example, may be a table that maps, relates, or associates the mashup identifier 66 to a listing of software components. The mashup algorithm 62 retrieves the software components of the desired mashup 28, such as the widget 32. The mashup algorithm 62 reads the single file 50 structure of the widget 32 to obtain the source definition 54 and the presentation definition 56. The mashup server 22 retrieves the source data 34 for the widget 32, and the source data 34 is incorporated into the mashup 28 according to the presentation definition 56.

Exemplary embodiments may be applied regardless of networking environment. The communications network (illustrated as reference numeral 24 in FIG. 1) may be a wired and/or wireless network having cellular and/or WI-FI® capabilities. The communications network 24, however, may also operate using any other frequency or standard, such as the BLUETOOTH® standard or the Internet Protocol (IP). The communications network 24, however, may be a cable network operating in the radio-frequency domain and/or the Internet Protocol (IP) domain. The communications network 24, however, may also include a distributed computing network, such as the Internet or an application of the Internet (such as cloud-based computing), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the IEEE 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Figure 9:
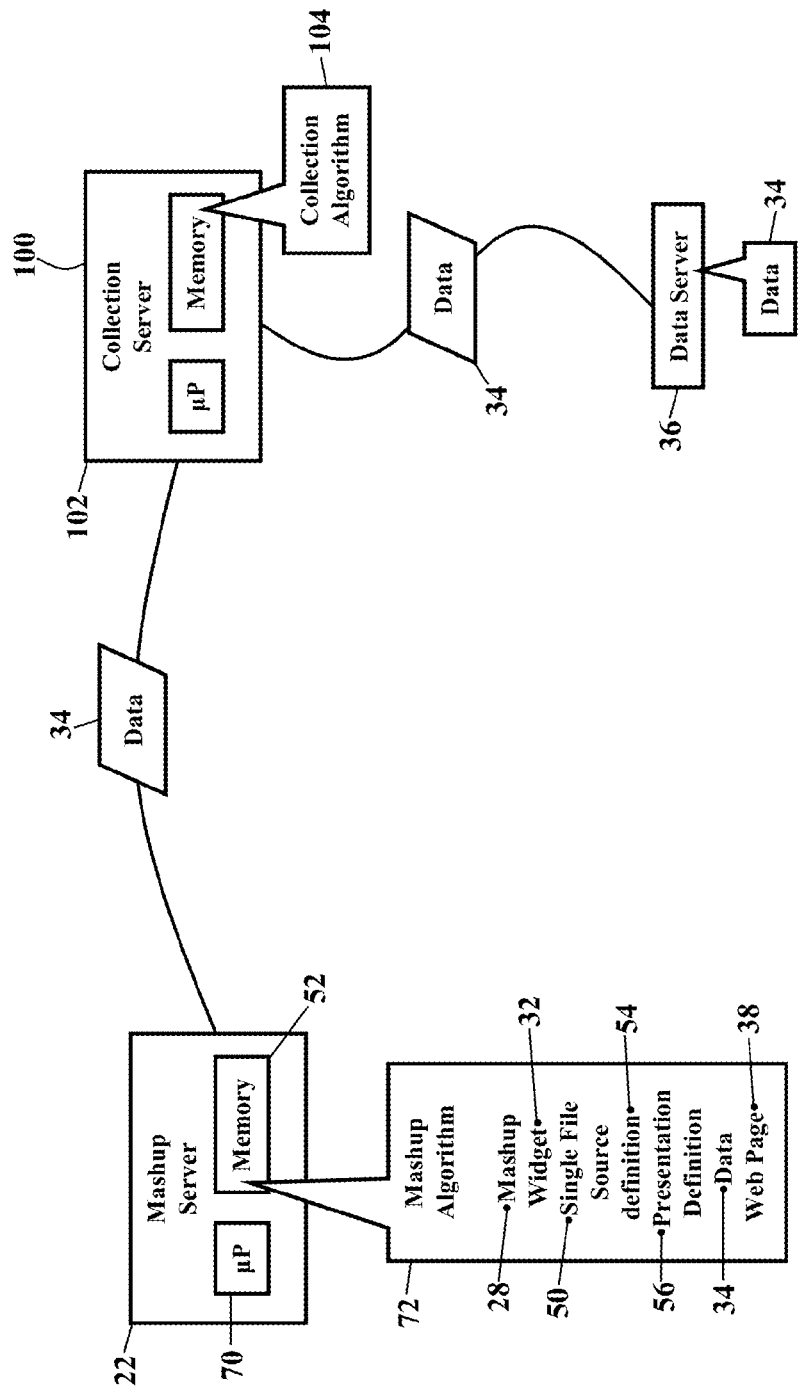
FIG. 9 is an alternate detailed schematic illustrating an operating environment, according to exemplary embodiments.

FIG. 9 is an alternate detailed schematic illustrating an operating environment, according to exemplary embodiments. Here a separate collector mechanism 100 may be used to collect the source data 34 required by the widget 32. Exemplary embodiments, in other words, may not burden the mashup server 22 with both collection of the source data 34 and generation of the mashup 28. Exemplary embodiments, instead, may use the separate collector mechanism 100 to retrieve the source data 34. A collector server 102, for example, may collect the source data 34 required by the widget 32. The collector server 102 has a processor (e.g., "µP"), application specific integrated circuit (ASIC), or other component that executes a collector algorithm 104 stored in a local memory. The collector mechanism 100 collects the source data 34 specified by the source definition 54. The collector server 102 may then send, forward, or pass the source data 34 to the mashup server 22. The collector server 102 may even transform the source data 34 into any format desired by the mashup algorithm 72. The mashup algorithm 72 and the collector algorithm 104 may thus cooperate in a client-server relationship to build the mashup 28 using the source data 34 specified by the widget 32.

Figure 10:
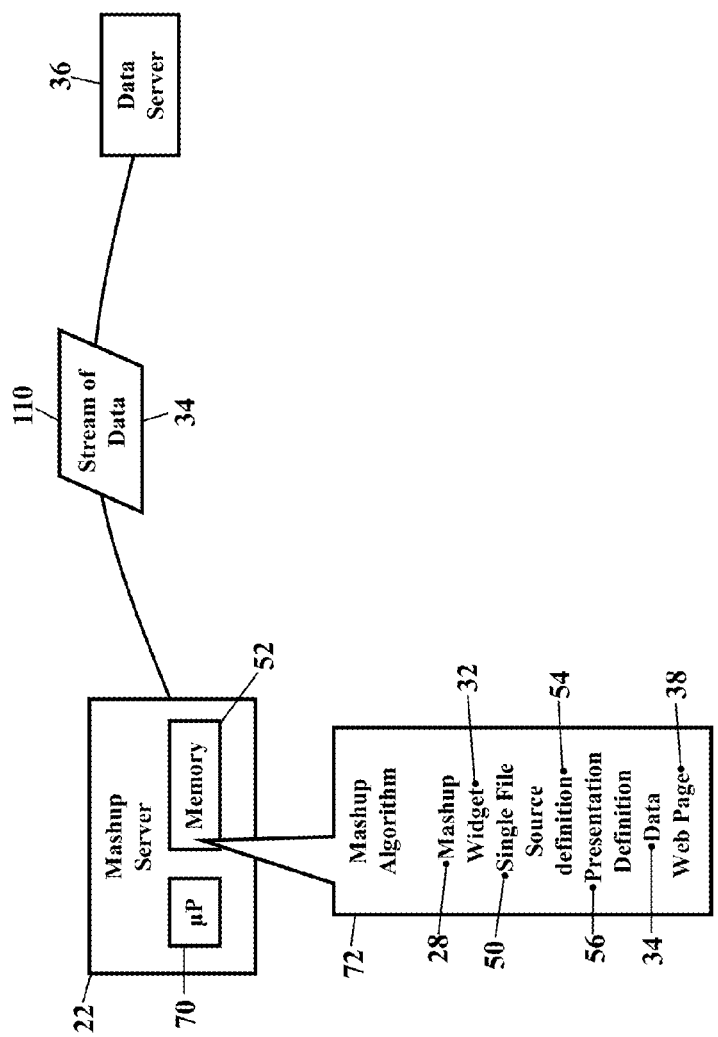
FIG. 10 is a schematic illustrating streaming sources, according to exemplary embodiments.

FIG. 10 is a schematic illustrating streaming sources, according to exemplary embodiments. As earlier paragraphs explained, the widget 32 has the single file 50 structure specifying the source definition 54 and the presentation definition 56. Sometimes the source definition 54 may specify a real-time or near real-time stream 110 of data as its source. FIG. 10, for simplicity, illustrates the stream 110 of data being retrieved from the data server 36. In practice, though, the stream 110 of data may be retrieved from any third party provider, any subscription service, or any web service. Regardless, the provider may convert the stream 110 of data into plain old JAVA® objects (such as a JavaBean) using JAVA® database connectivity, JAVA® message service, web services, data logging, or any other formatting. Once the stream 110 of data is obtained, the mashup algorithm 72 incorporates the stream 110 of data into the widget 32 to build the mashup 28.

Figure 11:
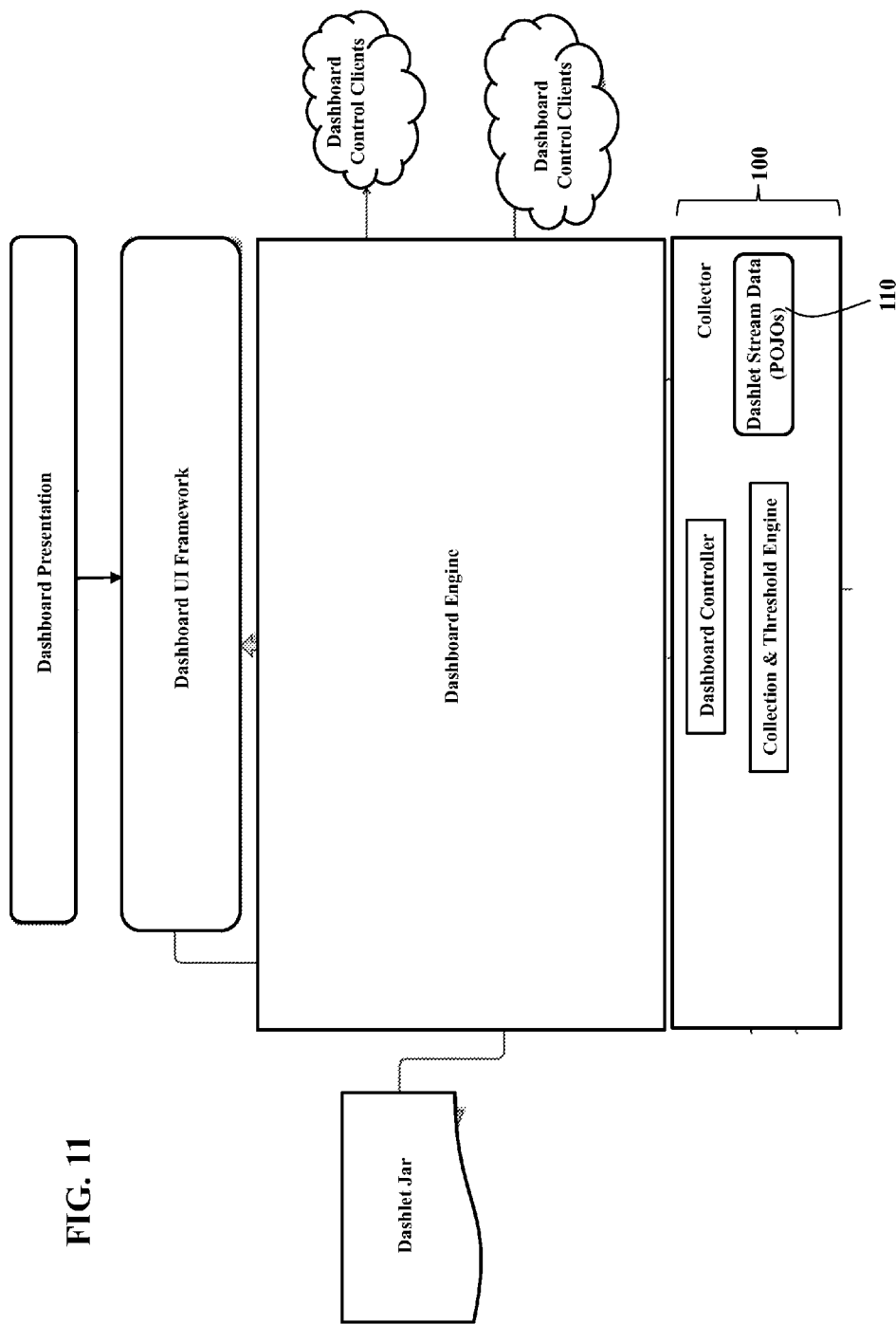

FIGS. 11-12 are schematics illustrating a detailed operating environment, according to exemplary embodiments. Here one or more streams 110 of data are collected from stream providers, according to the source definition 54 specified by each widget 32. The collector mechanism 100 passes the streams 110 of data to the mashup server 22. The mashup server 22 acts as a software engine to incorporate the streams 110 of data into the mashup 28, according to the widget 32.

Exemplary embodiments may include thresholding and alerting. As the one or more streams 110 of data are received, exemplary embodiments may compare the stream 110 of data to one or more threshold values. Some logical statement is defined that compares any data value in the stream 110 of data to a threshold value. If the data value satisfies or matches the threshold value, then an action is taken. The action, for example, may include a visual notification that is displayed in the mashup 28. The visual notification alerts the user of the client device 20 to some unexpected or out-of-spec condition in the source data 34.

Visualization may be explained. As FIG. 11 illustrates, a visualization engine may be triggered by a loader and installs resources required for visualization of the widget 32. A dashboard controller provides web services for widget 32 (or dashlet) installation and management, stream management, and threshold and alerting management. The Loader provisions the mashup 28 with new dashlets and loads pre-packaged and installable widgets (perhaps in the JAVA® archive format). An alerts engine includes a pre-packaged alerts dashlet that subscribes to threshold streams (with stream subscription service of streams cache) and configurable alert destinations. A streams cache provides another web service that supports fetching of stream posts and cache control. The streams cache may have any type and/or characteristic, such as a weak hashmap (homegrown, on vm heap, single instance), an off heap map (homegrown, nio, single instance), an ORACLE® Coherence (distributed, commercial, non-persistent, non-time series), and/or an APACHE® Cassandra (distributed, open-source, persistent, time-series). The dashboard controller may interact with a model view controller (MVC) framework that provides streams access to controllers and delivers alerts to controllers. The dashboard controller may also have an interface to a collector and thresholding engine that compares any data value in the stream 110 of data to a threshold value for both direct (in-process) and indirect (out-of-process w/s) sources. FIG. 12 further illustrates an architecture for the model view controller (MVC) illustrated in FIG. 11.

The collector mechanism 100 may also be further explained. The collector and thresholding engine manages the stream providers, the stream definitions, and the stream subscription services. The collector and thresholding engine also provides a web service to the collector mechanism 100. The web service provides stream definition, stream control, and stream subscriptions. The stream providers collect the source data, support scheduling, support threshold detection (basis for alert definitions), support aggregation and/or summarization, and broadcast the stream(s) 110 of data. The collector mechanism 100 may also provide an outgoing interface to the dashboard engine for direct (in-process) and indirect, processing that isolates the collector from the engine data path (stream results).

FIGS. 13-14 are more detailed schematics illustrating the single file 50 structure of the widget 32, according to exemplary embodiments. The widget 32 is a pluggable component of the mashup 28 and defined by its source definition 54 and its presentation definition 56. The widget 32 may self identify itself with a text identifier 120 and a classification 122. The source definition 54 identifies its controller component(s) 124, streaming engine data source(s) 126, and a polling interval 128 of the streaming data to obtain. The presentation definition 56 specifies the corresponding visualization parameters (such as JSP, HTML, CSS, images, and other resource specifications). The single file 50 structure of the widget 32 embeds the visualization elements in the dashboard resources, and the controller and stream classes are pre-defined in the single file 50 structure. The controller component(s) 124 may instruct the mashup server 22 (or software engine) to pre-load the streams 110 of data. The mashup server 22 calls, invokes, or uses application programming interfaces (or APIs) for dynamic control of the widget 32. The widget's resources may be held in a JAVA® archive (or JAR) using a pre-defined widget format. FIG. 14 illustrates the single file 50 structure of the widget 32 in the JAVA® archive (or JAR) format. Here the JAVA® archive format may be used to provide both the visualization definition and tailoring.

The stream 110 of data may thus define its origination and syntax. The stream 110 of data may thus specify its collection method and syntax of the source data 34 processed by the engine. Each stream 110 of data may be named and typed, and a group of streams 110 of data, having a same type classification, may share a single stream provider. Each stream 110 of data may thus be registered with its provider. Each stream 110 of data may define the one or more polling intervals 128 or be on-demand. Each stream 110 of data may self-represent itself as the plain old JAVA® objects. Each stream provider may source all streams 110 of data in its type class and works with any underlying data source(s). The stream provider may be responsible for starting or stopping the stream 110 of data. The stream provider may obtain any supplemental stream information (e.g., query string), and the stream provider may provides a stream listener to enable cache updates.

FIG. 15 is another schematic illustrating the mashup 28, according to exemplary embodiments. The mashup's look and feel determines the user's overall experience. The widget 32 and/or the mashup 28 may have one or more themes, drag and drop panels (portlet like), and layout control (panel grid in 2×2, 2×4, etc). Exemplary embodiments may utilize asynchronous Javascript (or AJAX) for dynamic updates to the widget content without performing a refresh of the web page 38. Exemplary embodiments may utilize a push mechanism for live updates and/or asynchronous autonomous data pushes for real-time updates.

FIG. 16 is another schematic illustrating the widget 32, according to exemplary embodiments. Here the single file 50 structure summarizes port assignments ("pasummary") The source definition 54 specifies the stream provider (ES-PER) using SQL query support and "cron-like" polling. The source definition 54 also specifies a simple WeakHashMap in cache memory. FIG. 16 thus illustrates an example of the data source definition 54 specifying a JSP/JQuery format as a data table utilizing asynchronous Javascript (or AJAX) for dynamic updates.

The single file 50 structure of the widget 32 may utilize file compression. The widget 32 may have multiple components that are compressed into the single file 50 structure. Each file component may be individually compressed and archived within the single file 50 structure. When the single file 50 is read, each component file may be individually extracted and decompressed. The widget 32 may thus have its required components zipped into the single file 50 structure. The single file 50 may then unzip and reveal its component files. The single file 50, for example, may automatically unzip when a logical rule is satisfied. The single file 50, for example, may automatically bloom to reveal its component files based upon a location or an internal temperature of the client device 20 and/or the mashup server 22.

Figure 17:
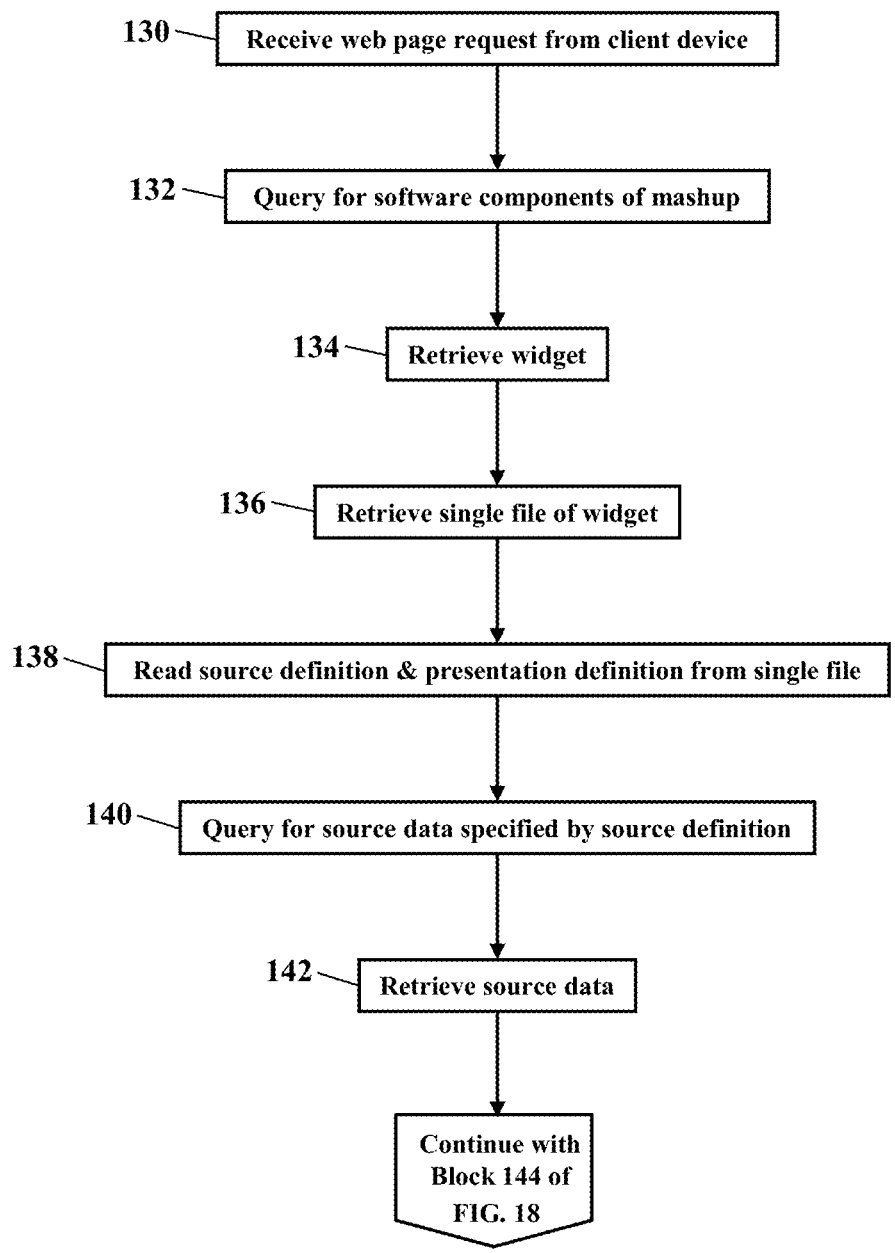
FIGS. 17-18 are flowcharts illustrating a method or algorithm for generating mashups, according to exemplary embodiments.
Figure 18:
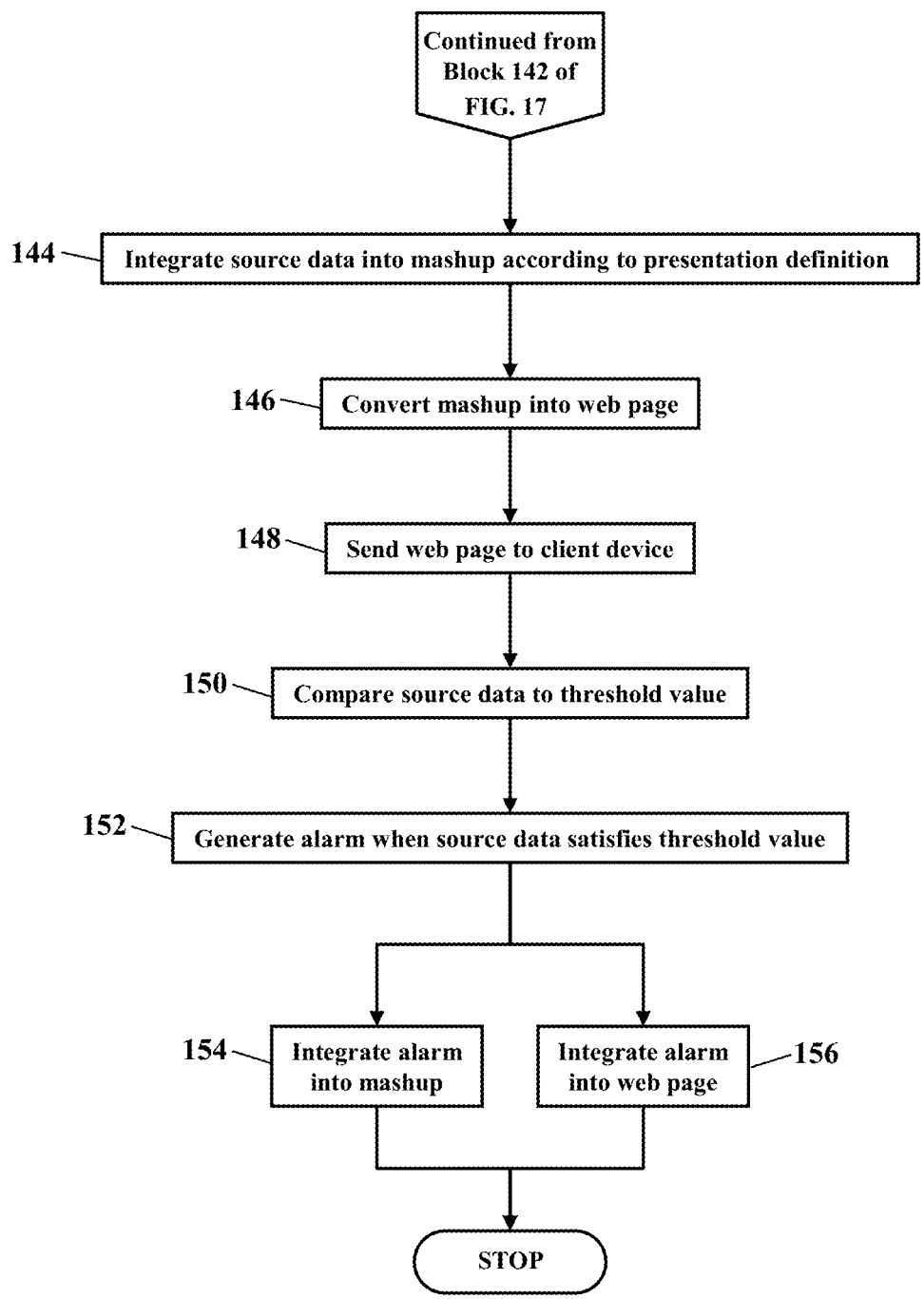

FIGS. 17-18 are flowcharts illustrating a method or algorithm for generating mashups, according to exemplary embodiments. The web page request 64 is received from the client device 20 (Block 130). The web page request 64 may specify the mashup identifier 66 associated with the requested mashup 28. A query is made for the software components of the mashup 28 (Block 132). The widget 32 is retrieved as one of the software components of the mashup 28 (Block 134). The single file 50 is retrieved that completely defines the widget (Block 136). The source definition 54 and the presentation definition 56 are read from the single file 50 (Block 138). A query is made for the source data 34 specified by the source definition 54 (Block 140). The source data 34 is retrieved (Block 142).

The algorithm continues with FIG. 18. The source data 34 is integrated into the mashup 28 according to the single file (Block 144). The mashup 28 is converted into the web page 38 (Block 146). The web page 38 is sent to the client device 20 (Block 148). The source data 34 is compared to a threshold value (Block 150). When the source data satisfies the threshold value, an alarm is generated (Block 152). The alarm is incorporated into the mashup 28 (Block 154) and into the web page 38 (Block 156).

Figure 19:
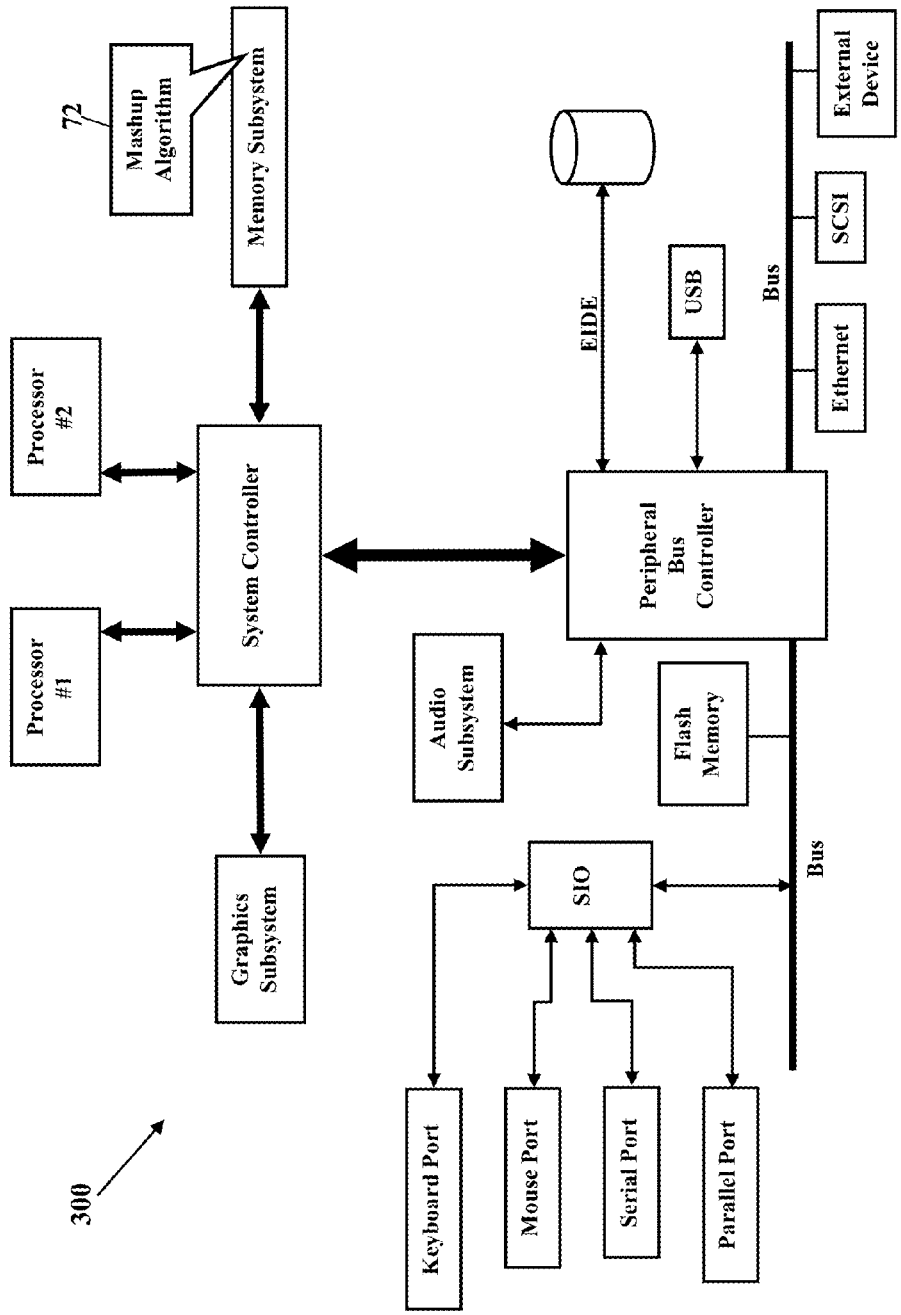
FIGS. 19-20 depict still more operating environments for additional aspects of the exemplary embodiments.

FIG. 19 is a schematic illustrating still more exemplary embodiments. FIG. 19 is a more detailed diagram illustrating a processor-controlled device 300. As earlier paragraphs explained, the mashup algorithm 72 may operate in any processor-controlled device. FIG. 19, then, illustrates the mashup algorithm 72 stored in a memory subsystem of the processor-controlled device 300. One or more processors communicate with the memory subsystem and execute either or both applications. Because the processor-controlled device 300 is well-known to those of ordinary skill in the art, no further explanation is needed. The mashup algorithm 72 may cause the processor 70 to perform operations for defining and/or blooming the widget 32. The mashup algorithm 72, however, may instruct or direct other components of the mashup server 22 and/or the processor-controlled device 300 to perform operations for defining and/or blooming the widget 32.

Figure 20:
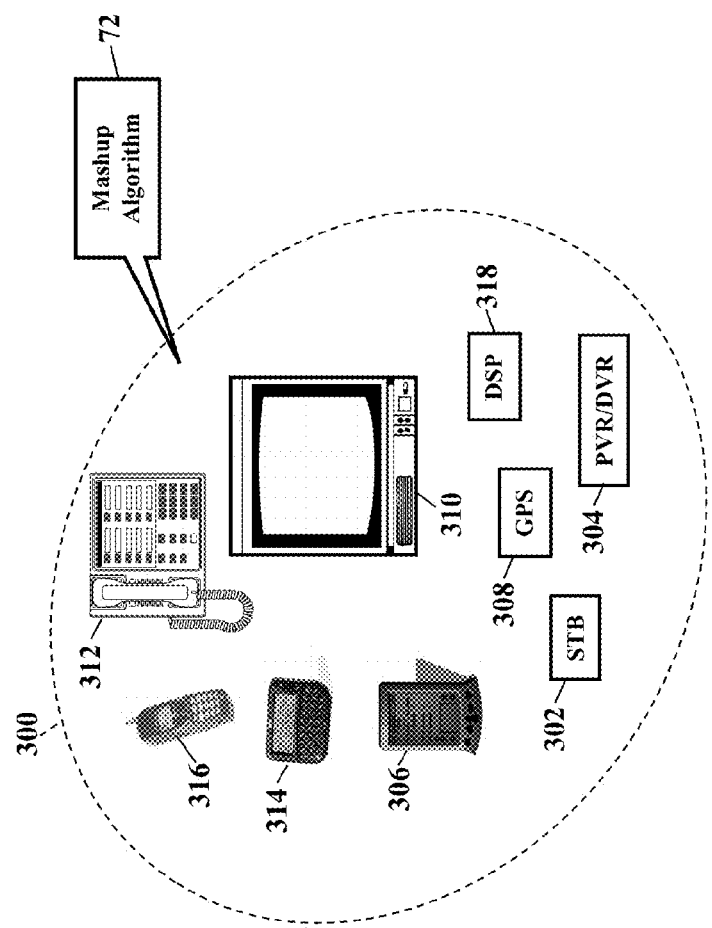

FIG. 20 depicts still more operating environments for additional aspects of the exemplary embodiments. FIG. 20 illustrates that the exemplary embodiments may alternatively or additionally operate within other processor-controlled devices 300. FIG. 20, for example, illustrates that the mashup algorithm 72 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or any processor-controlled device utilizing a digital signal processor (DP/DSP) 318. The processor-controlled device 300 may also include watches, radios, vehicle electronics, clocks, printers, gateways, mobile/implantable medical devices, and other apparatuses and systems. Because the architecture and operating principles of the various processor-controlled devices 300 are well known, the hardware and software componentry of the various processor-controlled devices 300 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for generating mashups, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A system, comprising:
a processor; and
a memory device, the memory device storing instructions that when executed causing the processor to perform operations, the operations comprising:
querying for software components associated with a graphical mashup;
retrieving a widget as one of the software components associated with the graphical mashup;
retrieving a single file that completely defines the widget, the single file structure having compressed therein multiple internal files;
extracting one of the multiple internal files compressed therein to determine source data associated with the widget, the source data specifying a polling interval for obtaining a stream of data as an input;
extracting a different one of the multiple internal files compressed therein to determine a presentation definition associated with the widget; and
incorporating both the source data according to the polling interval and the presentation definition into the graphical mashup.

2. The system of claim 1, wherein the operations further comprise generating a dashboard as the graphical mashup.

3. The system of claim 1, wherein the operations further comprise receiving a request for a web page, the request specifying a unique mashup identifier associated with the graphical mashup.

4. The system of claim 1, wherein the operations further comprise converting the graphical mashup into a web page.

5. The system of claim 4, wherein the operations further comprise sending the web page to a client device.

6. The system according to claim 1, wherein the operations further comprise mashing the software components to generate the graphical mashup.

7. The system of claim 1, wherein the operations further comprise generating an alert in response to the source data exceeding a threshold.

8. A method of generating a mashup, comprising:
receiving, by a server, an electronic request sent from a client device, the electronic request specifying a mashup identifier associated with the mashup;
querying, by the server, an electronic database for the mashup identifier, the electronic database having electronic database associations between widgets and mashup identifiers including the mashup identifier specified by the electronic request;
retrieving, by the server, a widget of the widgets from the electronic database, the widget having an electronic database association with the mashup identifier specified by the electronic request;
retrieving, by the server, a single file associated with the widget retrieved from the electronic database, the single file having compressed therein multiple internal files;
extracting, by the server, one of the multiple internal files compressed therein to determine source data associated with the widget, the source data specifying a polling interval for obtaining a stream of data as an input;
extracting a different one of the multiple internal files compressed therein to determine a presentation definition associated with the widget;
retrieving, by the server, the stream of data according to the polling interval specified by the source data; and
incorporating, by the server, the stream of data into the mashup according to the presentation definition extracted from the single file.

9. The method of claim 8, further comprising generating a graphical dashboard as the mashup.

10. The method of claim 8, further comprising receiving a request for a web page as the electronic request.

11. The method of claim 8, further comprising converting the mashup into a web page.

12. The method of claim 11, further comprising sending the web page to the client device.

13. The method of claim 8, further comprising querying for the source data specified by the source definition retrieved from the single file.

14. The method of claim 8, further comprising generating an alert in response to the source data exceeding a threshold.

15. A memory device storing instructions that when executed cause a processor to perform operations, the operations comprising:
receiving an electronic request for a webpage sent from a client device, the electronic request for the web page specifying a mashup identifier that uniquely identifies a mashup;
querying an electronic database for the mashup identifier, the electronic database having electronic database associations between widgets and mashup identifiers including the mashup identifier specified by the electronic request for the webpage;
retrieving a widget of the widgets from the electronic database, the widget having an electronic database association with the mashup identifier specified by the electronic request for the webpage;
retrieving a single file structure associated with the widget retrieved from the electronic database, the single file structure having compressed therein multiple internal files;
extracting one of the multiple internal files to determine a source definition associated with the widget, the source definition specifying a polling interval for obtaining a stream of data as an input;
extracting a different one of the multiple internal files to determine a presentation definition associated with the widget;
retrieving a stream of data according to the polling interval specified by the source definition; and
incorporating the stream of data into the mashup according to the presentation definition determined from the different one of the multiple internal files.

16. The memory device of claim 15, wherein the operations further comprise generating the mashup.

17. The memory device of claim 15, wherein the operations further comprise receiving a name associated with the mashup.

18. The memory device of claim 15, wherein the operations further comprise converting the mashup into the web page.

19. The memory device of claim 18, wherein the operations further comprise sending the web page to the client device.

20. The memory device of claim 15, wherein the operations further comprise generating an alert in response to the stream of data exceeding a threshold.

* * * * *